United States Patent [19]

Cummings et al.

[11] Patent Number: 4,873,274

[45] Date of Patent: Oct. 10, 1989

[54] IN-MOLD COATING POWDERS WITH TWO INITIATORS OR 1,1-DI(T-BUTYLPEROXY)-3,3,5-TRIMETHYLCYCLOHEXANE AS A SINGLE INITIATOR

[75] Inventors: Frederick L. Cummings, Reading; Glenn D. Correll, Birdsboro, both of Pa.

[73] Assignee: Morton Thiokol, Inc., Chicago, Ill.

[21] Appl. No.: 100,675

[22] Filed: Sep. 24, 1987

[51] Int. Cl.$^4$ ............................................. C08L 67/06
[52] U.S. Cl. ..................................... 523/500; 525/23; 525/25; 525/27; 525/43; 525/44; 525/45; 528/306
[58] Field of Search ..................... 525/27, 43, 44, 45, 525/23, 25; 523/500; 527/500; 528/306

[56] References Cited

U.S. PATENT DOCUMENTS

| | | | |
|---|---|---|---|
| 3,061,492 | 10/1962 | Singleton et al. | 154/43 |
| 3,216,877 | 11/1965 | Mohr | 156/230 |
| 3,230,284 | 1/1986 | Iverson | 264/73 |
| 3,311,035 | 3/1967 | Poskey et al. | 94/22 |
| 3,770,690 | 11/1973 | Oswitch et al. | 260/37 |
| 3,784,664 | 1/1974 | Nicklin | 264/246 |
| 3,812,074 | 5/1974 | Oswitch et al. | 260/31.8 |
| 3,917,790 | 11/1975 | Oswitch et al. | 264/267 |
| 3,926,902 | 12/1975 | Bowen | 260/40 |
| 4,001,153 | 1/1977 | Ogino et al. | 260/22 |
| 4,012,363 | 3/1977 | Bruning et al. | 260/75 |
| 4,016,115 | 4/1977 | Miyake et al. | 260/2.3 |
| 4,048,257 | 9/1977 | Stevenson | 260/862 |
| 4,074,006 | 2/1978 | Boldebuck et al. | 428/379 |
| 4,102,944 | 7/1978 | Fukuyama et al. | 260/861 |
| 4,123,488 | 10/1978 | Lawson | 264/135 |
| 4,133,843 | 1/1979 | Isaksen et al. | 260/850 |
| 4,135,009 | 1/1979 | Mercurio | 427/195 |
| 4,205,028 | 5/1980 | Brueggemann | 264/24 |
| 4,228,113 | 4/1986 | Van Gasse | 264/24 |
| 4,239,808 | 12/1980 | Arnason | 428/482 |
| 4,244,993 | 1/1981 | Platka, III et al. | 428/15 |
| 4,287,310 | 9/1981 | Van Gasse | 525/44 |
| 4,315,884 | 2/1982 | Van Gasse | 264/255 |
| 4,316,869 | 2/1982 | Van Gasse | 264/255 |
| 4,331,735 | 5/1982 | Shanoski | 428/423 |
| 4,349,601 | 9/1982 | Brueggemann | 428/323 |
| 4,356,230 | 10/1982 | Emanuel et al. | 428/290 |
| 4,499,235 | 2/1985 | Verwer | 525/38 |
| 4,515,710 | 5/1985 | Cobbledick | 252/511 |

FOREIGN PATENT DOCUMENTS

| | | |
|---|---|---|
| 572237 | 3/1959 | Canada . |
| 49-103958 | 10/1974 | Japan . |
| 280629 | 12/1987 | Japan . |
| 7903428 | 11/1980 | Netherlands . |
| 882225 | 11/1961 | United Kingdom . |
| 1034738 | 7/1966 | United Kingdom . |
| 1406229 | 9/1975 | United Kingdom . |
| 1420867 | 1/1976 | United Kingdom . |
| 1457935 | 12/1976 | United Kingdom . |

OTHER PUBLICATIONS

Lucidol General Catalog—*Peroxides and Specialty Chemicals* 1/1984 (Lucidol Div., Pennwalt Corp.).
English Language Abstract of Netherlands 7903428 (1980).
Kirk–Othmer Ency. of Chemical Technology, vol. 13, Third Edition, 1981, pp. 357–365.
Cech, J. H. and S. M. McSweeney, "A Custom Molder Evaluates Pre-Mold Powder Coating of Compression-Molded SMC Parts", The Society of the Plastics Industry, Inc., 1/84, Session 8-E, pp. 1-2.
Griffith, R. M., et al., "In-Mold Coating of SMC Moldings", The Society of Plastics Industry, Inc., 1977, Sec. 2C, pp. 1–3.
Johnson, H. C., et al., "Commercial Developments in Premold Powder Coating of R.P. Substrates", The Society of Plastics Industry, 1/84, Session 8-D, pp. 1-3, 8.
Miller, Dr. Emery P., et al., Fundamentals of Powder Coating, 1974, pp. 220–223, 228–233.
The Condensed Chemical Dictionary, Tenth Ed., 1981, pp. 786, 790.

*Primary Examiner*—Patricia Short
*Attorney, Agent, or Firm*—George Wheeler; Gerald K. White

[57] ABSTRACT

Unsaturated polyester resin coating powder composition consisting essentially of at least one unsaturated polyester resin; at least one copolymerizable second resin; and an initiator which comprises 1,1'-di(t-butylperoxy)-3,3,5-trimethylcyclohexane (AE), or which contains a small proportion of a fast initiator and a relatively large proportion of a slow initiator as defined herein. Initiator AE has been found to work better as a single initiator than other initiators previously employed in in-mold powder coating formulations. The combination of initiators works better than either one alone, and better than any of the few moderate rate initiators available. A method is also disclosed for forming a cured unsaturated polyester surface coating on a cured unsaturated polyester substrate by coating one of the previously stated powder compositions on a heated mold surface so the coating flows and coalesces to form a partially crosslinked coating, then putting a charge of reinforced polyester resin in the mold and closing the mold, maintaining a suitable pressure and temperature for a time sufficient to cure the fill resin and the coating. The coating and substrate are crosslinked across the interface between them when the part is cured. Use of the present compositions in such a process has been found to provide improved surface characteristics of the coating.

30 Claims, No Drawings

IN-MOLD COATING POWDERS WITH TWO INITIATORS OR 1,1-DI(T-BUTYLPEROXY)-3,3,5-TRIMETHYLCY-CLOHEXANE AS A SINGLE INITIATOR

TECHNICAL FIELD

The present invention relates to powdered unsaturated polyester resin formulations useful for in-mold coating reinforced polyester articles and to in-mold coating methods employing the compositions.

BACKGROUND ART

In-mold coating is a known technique for decorating or priming the surface of a molded article formed in a matched die mold under heat and pressure. The coating powder, which can be an unsaturated polyester formulation, is applied as a powder to the interior wall of the mold, preferably electrostatically. The powder melts due to the heat of the mold and coalesces on the mold surface to produce a uniform coating. The fill resin which constitutes the bulk of the finished article is then inserted in the mold and molded. When the cures of the coating and fill resin have advanced sufficiently, and the coating and fill resins are integral, the mold is opened and the molding removed. It has been found desirable that the coating and fill resins be crosslinked across the interface between them to maximize adhesion.

In-mold coating as described above is distinguished from post-mold coating processes, in which the fill resin is molded before the coating is introduced into the mold, and conventional decorating operations in which the fill resin is molded and cured in the mold, then released from the mold and decorated with a powder coating or other finish. Also to be distinguished are the gelcoat or liquid in-mold coating processes, in which a liquid resin is applied to the mold surface prior to molding a part. The gelcoat or liquid in-mold coating processes are not widely used for matched die molding of unsaturated polyester articles because the coating is hard to apply uniformly to the mold surface, overspray must be collected and removed, and the solvents or liquid monomers of the coating tend to flash away when sprayed on the hot mold, thus changing the coating formulation, creating bubbles and other irregularities in the coating, and making it necessary to contain and collect the vapor of volatile ingredients.

The following patents relate to in-mold coating processes of the type taught herein:

| U.S. Pat. No. | First Inventor | Issued |
|---|---|---|
| 3,216,877 | Mohr | 11/9/65 |
| 4,205,028 | Brueggemann | 5/27/80 |
| 4,228,113 | Van Gasse | 10/24/80 |
| 4,287,310 | Van Gasse | 9/1/81 |
| 4,315,884 | Van Gasse | 2/16/82 |
| 4,316,869 | Van Gasse | 2/23/82 |
| 4,349,601 | Brueggemann | 9/14/82 |
| 4,499,235 | Verwer | 2/12/85 |

British specification No. 1,420,867, published Jan. 14, 1976, teaches an analogous process except that the fill resin is first formed and apparently cured, then it is removed from the mold, the mold is powder coated, and the article is returned to the mold and remolded to apply the coating. Netherlands patent No. 7903-428, published Apr. 11, 1980, is believed to teach a similar process.

Of all the known references to initiators useful for curing polyester compositions, only U.S. Pat. No. 4,331,735 (issued May 25, 1982 to Shanoski) and the *LUCIDOL General Catalog—Peroxides and Specialty Chemicals* dated January, 1984 indicate the utility of 1,1-di(t-butylperoxy)-3,3,5-trimethylcyclohexane for curing polyester compositions generally. (LUCIDOL is a trademark of Pennwalt Corporation, Buffalo, N.Y.) Neither of these references recites a particular composition containing this initiator or indicates any preference for this initiator.

Several patents suggest using more than one peroxide initiator in a single resin composition, but none of them pertains to powder coating resins, and particularly to unsaturated polyester powder coating resins. The relevant patents of this type are as follows:

| U.S. Pat. No. | First Inventor | Issued |
|---|---|---|
| 4,123,488 | Lawson | 10/31/78 |
| 4,331,735 | Shanoski | 5/25/82 |
| 4,515,710 | Cobbledick | 5/7/85 |
| 3,230,284 | Iverson | 1/18/66 |

The Shanoski patent, column 5, lines 56–59, and Cobbledick at column 5, lines 31–34, each state, "It is desirable sometimes to use mixtures of initiators to take advantage of their different decomposition rates and times at different temperatures and so forth." No criteria for selecting a mixture of initiators are given. Example IV of Shanoski employs a combination of 1.87 parts by weight of t-butylperbenzoate (our species AJ in Table I below) and 0.206 parts by weight t-butylperoctoate (our species W in Table I below) per 100 parts by weight of resin as an initiator for a liquid in-mold coating. The former initiator is a slow initiator (except for its small proportion) and the latter initiator is a fast initiator as defined below. The Cobbledick reference does not employ more than one initiator at a time in its working examples. Iverson teaches an unsaturated polyester based coating, initiated with a solution of 100 parts by weight of methylethylketone peroxide (60% in dimethylphthalate) and 3 parts by weight of peroxyacetic acid. Peroxyacetic acid explodes at 110° C., according to the *Condensed Chemical Dictionary*, 10th Ed.

Referring once again to the prior art relating to single initiator in-mold coating powders, the prior technology ignores the different effects of fast and slow initiators as defined later herein, and does not reveal that the use of a fast initiator alone does not provide an acceptable coating, while the use of a slow initiator alone at common molding temperatures requires a large proportion of the initiator or lengthens the mold cycle time undesirably by slowing the cure of the coating. The art has also not appreciated the absence of acceptable moderate rate initiators available for use as single initiators in coating powder compositions for in-mold coating. Another disadvantage of many prior art initiators is their short shelf life, either alone or when formulated into coating powders. Many of these initiators and their resulting compositions must be refrigerated prior to use, and in many cases the initiator must be mixed with the balance of the composition shortly before use.

SUMMARY OF THE INVENTION

The present inventors have discovered that unsaturated polyester in-mold coating powders comprising from about 3 to about 15 parts, preferably from about 3 to about 9 parts, more preferably about 4.8 to about 9 parts, most preferably about 4.8 to 6 parts, of 1,1-di(t-butylperoxy)-3,3,5-trimethylcyclohexane as an initiator per 100 parts by weight of resin provide superior coatings compared to prior powders containing single initiators or combinations of different initiators.

The present inventors have also discovered that an unsaturated polyester coating powder for in-mold coating use can be improved substantially by employing a combination of a fast initiator and a slow initiator as defined below to initiate ethylenic polymerization of the coating. Compared to compositions, containing only a fast initiator, the present invention greatly improves coating quality. Compared to compositions containing only a slow initiator (including 1,1-di(t-butylperoxy)-3,3,5-trimethylcyclohexane), the present invention provides a much shorter mold cycle time, and therefore makes production much more efficient than is possible with a slow initiator alone. A further advantage of the present two-initiator invention is that the total amount of the initiators can be minimized, thus reducing the cost of the compositions and enabling a liquid initiator to be used without promoting blocking in some instances.

These two-initiator unsaturated polyester resin coating powder compositions consist essentially of an unsaturated polyester resin, a copolymerizable second resin, and a combination of a fast initiator and a slow initiator as defined below. More specifically, the composition contains from about 0.01 to about 2 parts by weight, preferably from about 0.1 to about 0.3 parts by weight (per 100 parts of resin), of a fast initiator and from about 3 to about 7 parts by weight, preferably from about 4 to about 6 parts by weight (per 100 parts of resin), of a slow initiator. The total amount of initiator is sufficient to initiate crosslinking of the powder composition on the surface of a matched die mold at a mold temperature between about 127° C. and about 171° C., a mold pressure between about 450 N/cm$^2$ and about 1380 N/cm$^2$, and a mold time between about 1 minute and about 12 minutes. The present coating powder formulations typically have shelf lives of at least about 6 months at 90° C.

A third aspect of the invention is a method for in-mold coating an unsaturated polyester resin powder on an unsaturated polyester substrate so that the substrate and coating are crosslinked across their interface, comprising the steps of providing one of the coating powder compositions described above; applying it to a mold surface held at a temperature between about 127° C. and about 171° C.; maintaining the composition on the mold surface at the indicated temperature until the coating flows and coalesces to form a partially crosslinked coating; and contacting the coating with a no more than partially crosslinked fill resin. The contacting step is continued at least until the coating and substrate crosslink across the interface between them.

DETAILED DESCRIPTION OF PREFERRED EMBODIMENTS

Unsaturated polyester coating powder compositions according to the first aspect of the present invention consist essentially of:

a. about 20–100 parts by weight, preferably 50 to 95 parts by weight, of at least one unsaturated polyester resin;
b. about 0–80 parts by weight, preferably 5 to 50 parts by weight, of at least one copolymerizable second resin, wherein the total proportion of resin in the formulation is 100 parts by weight; and
c. from 3 to about 15 parts by weight, preferably from about 3 to about 9 parts by weight of 1,1'-di(t-butylperoxy)-3,3,5-trimethylcyclohexane.

Unsaturated polyester coating powder compositions according to the second aspect of the present invention consist essentially of:

a. from about 20 to 100 parts by weight, preferably from about 50 to about 95 parts by weight, of at least one unsaturated polyester resin;
b. from 0 to about 80 parts by weight, preferably from about 5 to about 50 parts by weight of at least one copolymerizable second resin, wherein the total proportion of resin in the formulation is 100 parts by weight;
c. from about 0.01 to about 2 parts by weight, preferably from about 0.1 to about 0.3 parts by weight, of a fast initiator; and
d. from about 3 to about 7 parts by weight, preferably from about 4 to about 6 parts by weight, of a slow initiator.

Each of these components and other components useful in the present compositions are described below.

Unsaturated Polyester Resin

The unsaturated polyester resins useful herein are thermoplastic (before being crosslinked), ethylenically unsaturated reaction products of an organic di- or polyfunctional acid and a di- or polyfunctional alcohol. Small amounts of monofunctional acids and alcohols may also be present for polyester chain termination purposes. Although unsaturation may be supplied by the alcohol, typically the acid is unsaturated and the alcohol is saturated. Saturated acids can also be present to reduce the density of ethylenic unsaturation in the polyester. The preferred unsaturated polyesters useful herein melt substantially above room temperature and below the desired mold temperature.

The following are examples of ethylenically unsaturated di- or polyacids useful herein. It should be noted that whether acids, hydrides, or lower alkanol esters are listed here, any of those forms are contemplated:

maleic anhydride;
fumaric acid;
citraconic anhydride;
itaconic acid;
endo-cis-bicyclo[2,2,1]-5-heptene-2,3-dicarboxylic acid;
1,4,5,6,7,7-hexachlorobicyclo[2,2,1]-5-heptene-2,3dicarboxylic acid (chlorendic acid);
mesaconic acid;
dimeric methacrylic acid; and
methylbicyclo[2,2,1]-heptene-2,3-dicarboxylic anhydride.

The following are examples of ethylenically saturated diacids or polyacids contemplated as ingredients of the polyesters herein, in combination with a substantial proportion of an unsaturated diacid:

tetrachlorophthalic acid;
tetrabromophthalic acid;

phthalic anhydride;
adipic anhydride;
tetrahydrophthalic acid;
isophthalic acid;
terephthalic acid;
trimellitic acid;
azeleic acid;
sebacic acid;
dimethylterephthalate;
dimethylisophthalate;
succinic acid;
dodecanedicarboxylic acid;
hexahydrophthalic acid;
hexachlorooctahydromethanonaphthalene dicarboxylic acid;
malonic acid;
glutaric acid;
oxalic acid;
pimelic acid;
suberic acid; and
pyromellitic anhydride.

Acid monomers contemplated herein which are monoacids, and will thus terminate polyester chains, include the following:

linoleic acid;
linolenic acid;
geranic acid;
dehydrogeranic acid;
sorbic acid;
heptatri-1,3,5-ene-1-carboxylic acid;
nonatetra-1,3,5,7-ene-1-carboxylic acid;
other fatty acids of vegetable oils;
abietic acid;
methacrylic acid; and
benzoic acid.

Alcohols

The following alcohols are representative of those useful herein for making polyester resins. Diols useful herein include:

ethylene glycol;
diethylene glycol;
triethylene glycol;
1,2-propylene glycol;
1,3-propylene glycol;
1,4-dimethoxycyclohexane;
1,2-butylene glycol;
1,3-butylene glycol;
1,4-butylene glycol;
1,2-cyclopentanediol;
1,3-cyclopentanediol;
1,4-cyclopentanediol;
1,2-cyclohexanediol;
1,3-cyclohexanediol;
1,4-cyclohexanediol;
4,4'-methylene-bis(cyclohexanol);
4,4'-isopropylidene-bis(cyclohexanol);
1,3-bis(hydroxymethyl)cyclohexane;
1,3-bis(hydroxyethyl)cyclohexane;
1,3-bis(hydroxypropyl)cyclohexane;
1,3-bis(hydroxyisopropyl)cyclohexane;
xylene glycol;
bisphenol A;
hydrogenated bisphenol A;
bisphenol A/propylene oxide adducts;
hydroquinone/propylene oxide adducts;
hydroquinone/ethylene oxide adducts;
neopentyl glycol;
dipropylene glycol;
1,6-hexanediol;
2,2,4-trimethyl-1,3-pentanediol;
1,3-isobutanediol;
1,2-isobutanediol;
2,3-butanediol;
2-butenediol(1,4).

One or more polyols having 3 or more hydroxyl functional groups per molecule can also be used in small amounts to form branched polyesters. The following polyols are representative of those useful herein:

glycerol;
trimethylolpropane;
pentaerythritol;
allyl ether polyols;
polyalkylene glycol ethers;
hydroxyalkyl ethers;
1,1,1-trimethylol ethane;
sorbitol;
mannitol;
diglycerol; and
dipentaerythritol.

Exemplary polyester formulations useful herein are specified in the working examples.

Copolymerizable Resins

The polyester resins useful herein work best in combination with copolymerizable second resins having ethylenic unsaturation, and preferably having two sites of unsaturation per molecule. Most preferred is a predominance of monomers or prepolymers which are solid at room temperature or above so that they can easily be formulated into nonsintering powders. The preferred compounds are as follows:

diallyl phthalate prepolymers;
iso-diallyl phthalate prepolymers;
para-diallyl phthalate prepolymers;
triallyl cyanurate;
N,N'-methylene bisacrylamide;
N,N'-diallylmelamine;
acrylamide;
diacetone acrylamide (monomer or dimer);
diallyl chlorendate methacrylamide;
triallylisocyanurate;
neopentyl glycol diacrylate;
copolymers of maleic anhydride and alkylene oxides, for example, propylene oxide, ethylene oxide, and others;
maleinimide;
pentaerythritol tetraacrylate;
pentaerythritol triacrylate; and
low molecular weight polybutadienes.

If the copolymerizable second resin is a liquid or a sticky powder used in sufficient quantity that the resulting melt-mixed composition is not free flowing, the comonomer can be absorbed on an inert filler such as fumed silica and thus be counted as a solid within the preferred scope of the present invention. Some liquids which may be useful on this basis include ethylenically unsaturated compounds generally, and preferably diallylmaleate or monomeric diallyl phthalate. Except in small quantities, these liquid species are much less preferred than solid comonomers, due to their tendency to evaporate when placed on a hot mold surface.

Initiators

The initiators provided herein cure unsaturated polyester compositions by initiating reactions at sites of ethylenic unsaturation. The initiators useful herein are separated into fast initiators and slow initiators according to their half-life temperatures Moderate initiators are also defined herein for the sake of completeness.

The temperature at which the half-life of the initiator is 10 hours (meaning that half of the initiator decomposes every 10 hours) is the ten hour half-life temperature, $T_{\frac{1}{2}}$ (10 hours), of the initiator. Similarly, the temperature at which the half-life of the initiator is one hour is reported as $T_{\frac{1}{2}}$ (1 hour). It will usually be found that the one hour half-life temperature is $19°\pm5°$ C. higher than the ten hour half-life temperature. Half-lives are commonly measured in a dilute solution of the initiator in benzene, toluene, or trichloroethylene.

Fast Initiators

Initiators having a ten hour half-life at not more than 82° C. (and preferably not less than about 50° C.) are defined herein as fast initiators.

Diacyl peroxides are typically fast or very fast peroxide initiators, having ten hour half-lives between about 20° and 75° C. Diacyl peroxides have the following structure:

in which each R is typically, but not necessarily, identical. (Note: throughout this specification R, R', R'', and R''' each can be a hydrocarbon moiety selected from alkyl, cycloalkyl, and aryl, optionally substituted by alkyl, cycloalkyl, or aryl or heterosubstituted by halogen, nitrile, oxyalkyl, and other species.) Exemplary, commercially available diacyl peroxides include species A-G in Table I.

Acetyl alkysulfonyl peroxides are very fast initiators, having ten-hour half-lives between about 32° and 42° C., and the chemical structure:

One commercially available peroxide of this type is acetyl cyclohexylsulfonyl peroxide, (species I of Table I).

Dialkyl peroxydicarbonates have ten hour half-lives at from about 49° C. to about 51° C. These fast initiators have the structure:

Representative, commercially available compounds of this type are species J-N in Table I.

Peroxyesters range from fast to slow, having ten hour half-lives at temperatures ranging from about 49° to about 107° C. They have the following structure:

in which R and R' are frequently, but not necessarily, different. Representative, commercially available peroxyesters which are fast initiators are indicated as species O-X in Table I.

Certain azobis(alkyl nitrile) compounds having the following structure:

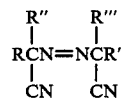

are also useful herein as fast initiators. Several commercially available compounds of this type are species Z-AB in Table I.

Any mixture of two or more fast initiators is also contemplated as a fast initiator herein.

Moderate Initiators

Moderate initiators are those having a ten hour half-life at more than 82° C. and less than 91° C. There are very few moderate initiators, and none of them has been successfully used, so far, as the sole initiator in a formulation according to the present invention. Kirk-Othmer, *Encyclopedia of Chemical Technology*, Vol. 13, p. 357, under the article "Initiators" and heading "Peroxides," lists many peroxide initiators and their ten hour half-lives. None of those initiators have the half-life typical of a moderate initiator. The only material listed in the *LUCIDOL General Catalog—Peroxides and Specialty Chemicals* (LUCIDOL is a trademark of Pennwalt Corporation, Buffalo, N.Y.), dated January, 1984, having the ten hour half-life of a moderate initiator is t-butylperoxymaleic acid (AC), which has a ten hour half-life at 87° C. and a one hour half-life at 110° C. Initiator AC provides a slow stroke cure time in the present formulations. Species AD, which has the ten hour half-life of a moderate initiator, also provides a slow stroke cure at 2.59 parts per 100 parts by weight of resin. (Its stroke cure time under these conditions is 41.5 seconds.) Species AD is not preferred because it causes excessive foaming in the coating.

SLOW INITIATORS

Slow initiators are those having a ten hour half-life at about 91° C. or more, preferably at no more than about 100° C.

Peroxyketal initiators have the following structure:

in which each R and R' can be the same or different and the two R groups can be concatenated to form a saturated ring. Peroxyketals are typically slow initiators having a 10 hour half-life at from about 92° C. to about 115° C. 1,1-di(t-butylperoxy)-3,3,5-trimethylcyclohexane (AE), used alone at about 8 to 9 parts per 100 parts of resin and provided as LUPERSOL 231-XL (LUPERSOL is a trademark of Pennwalt Corporation, Buffalo, N.Y.), functions aesthetically as a fast initiator, but provides a slow stroke cure time. If used at a low concentration, such as about 4.8-6 parts per hundred parts resin, it functions in all respects as a slow initiator.

The peroxyesters listed as species AF-AL in Table I are slow initiators.

The dialkylperoxides are typically very slow initiators ($T_{\frac{1}{2}}$ is 10 hours at from about 115° C. to about 133° C.) having the following general structure:

wherein each R and R' can be the same or different and z is selected from 1 and 2. The dialkylperoxides available commercially are species AM-AQ in Table I.

Hydroperoxide initiators, having the general structure:

wherein v is 1 or 2, are slow initiators, and are usually too slow to be of commercial importance (their ten hour half-lives occur at from 133° to 172° C.). Representative, commercially available hydroperoxides are listed in Table I as species AR-AU.

Ketone peroxides usually have the structure:

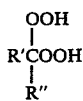

and are slow initiators. Exemplary species are Av-BB found in Table I.

OO-t-alkyl-O-alkylmonoperoxycarbonates are slow initatiors having the structure:

wherein R is tertiary alkyl having from 4 to about 10 carbon atoms, optionally substituted by phenyl, and R' is alkyl. If R is t-butyl, for any R, the half-life is 10 hours at 99°-100° C. Other exemplary R moieties are t-amyl and t-octyl. One exemplary species is OO-t-butyl-O-isopropyl monoperoxycarbonate (BC). If R is a higher tertiary alkyl or phenalkyl moiety, the rate of initiation increases with the weight of the alkyl or phenalkyl moiety, but typically remains within the range of a slow initiator.

Two miscellaneous slow initiators are p,p'oxybis(benzene sulfonyl hydrazide), having the structure:

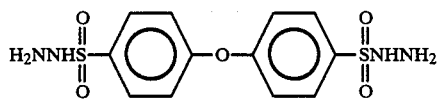

and accelerated azocarbonamide (BE), which has an unknown structure, sold under the trademark CELOGEN by the Uniroyal Chemical Division of Uniroyal, Inc., Naugatuck, Conn. Of the slow initiators, species BD and BE are less preferred because they cause the present coatings to foam excessively.

Looking now at all the initiators, those which are solids, solutions or liquids usable at low concentrations, or liquids absorbed on solid carriers, are preferred because compositions containing them are less likely to sinter upon standing. (Another advantage of the present two initiator compositions is that the amount of a liquid slow initiator can be reduced substantially, thus reducing the likelihood or severity of sintering, by adding a smaller proportion of a fast initiator.)

Other Ingredients

In addition to the primary ingredients identified above, other ingredients might also be useful or necessary for particular compositions. Such additives include, but are not limited to, the following. Polymerization inhibitors useful herein to increase the storage life of some polyester compositions include benzoquinone, hydroquinone, and p-t-butyl catechol. Polymerization accelerators, which act in conjunction with an initiator to speed the rate of reaction, include cobalt octoate, cobalt naphthenate, and diethyl aniline. Flow or leveling agents can be useful herein to promote the formation of a continuous, smooth coating on the mold surface when the coating powder is distributed on it. Such agents potentially useful herein include polyacrylic acid, nonionic fluorinated alkyl ester surfactants, nonionic alkylarylpolyether alcohols, and the flow or leveling agents listed in U.S. Pat. No. 4,205,028, col. 4, lines 6-29. (This patent, cited above, is hereby incorporated herein by reference.) The composition should also contain a homogeneous lubricant to serve as a mold parting agent. A particular lubricant useful herein is zinc stearate. Ultraviolet absorbers, antioxidants, and other materials can also be added within the scope of the present invention.

For each 100 parts by weight of resin in the formulation, from 0 to about 100 parts by weight of fillers, pigments, and opacifiers can be added. Some pigments contemplated for use herein include the following:

carbon black;
titanium dioxide;
chrome oxide (green);
zinc oxide;
ferrite yellow oxide;
ferric oxides;
raw sienna;
burnt sienna;
copper phthalonitrile blue;
phthalocyanine green;
ultramarine blue;
toluidine red;
parachlor red;
cadmium reds and yellows;
phthaloorganamine blues and greens;
iron blues;
phthalocyanine blues;
organic maroons; and
lead chromate.

Opacifiers and fillers contemplated for use herein, not distinguished herein according to function, include the following:

silica;
glass frit or flour;
calcium carbonate;
ammonium chloride;
ammonium bromide;
mica;

boric acid;
antimony trioxide;
fumed alumina;
clays such as kaolin;
talc
lithopone;
zinc sulfide;
lead titanate;
zirconium oxide;
white lead;
barium oxide;
calcium oxide or hydroxide;
magnesium oxide or hydroxide;
chalk;
asbestos;
ceramic, hollow glass, or resin microspheres;
pearl essence;
barytes;
china clay;
diatomaceous earth;
barium sulfate;
aluminum trihydrate;
onyx flour; and
calcium silicate.

The choice of fillers, pigments, and opacifiers is generally not critical. To suspend such ingredients the pigment or filler dispersing agents of U.S. Pat. No. 4,016,115, issued to Miyake, et al. on Apr. 5, 1977, might prove useful herein. That patent is hereby incorporated herein by reference.

Formation of Coating Powder Compositions

First, the ingredients are blended together in a tumbler or other similar mixing apparatus for roughly 30 seconds to one minute, until the mixture is homogeneous. Any ingredients which are liquid at the mixing temperature can optionally be absorbed onto a dry substrate, which may constitute one of the other ingredients of the mixture. Mixing is continued until the mixture is homogeneous and dry.

Next, the mixture is melt-mixed, preferably in an extruder. The extruder mixes, dissolves and disperses the ingredients and extrudes the mixture, which is passed through chill rolls to solidify it and prevent premature curing. The rolled mixture is passed through a chipper to reduce it to a form which can easily be ground to a powder. After grinding, the resulting powder is screened to remove all particles which will not pass through a no. 100 screen (U.S. Standard Sieve Series). If necessary, the grinding steps can be practiced at a reduced temperature to prevent the ingredients from being liquefied by the grinding process.

Selection of Fill Resin

The chemistry of the fill resin and the coating powder should be compatible to avoid adhesion problems in the molding. These problems are manifested as bubbles between the fill resin and coating of the finished part, or as insufficient adhesion of the fill resin and coating. This consideration makes it important to formulate the in-mold coating powder for a particular fill resin, or vice versa.

Molding Conditions

While compositions according to the present invention can be formulated to operate best under various molding conditions, the typical in-mold coating equipment operates at a mold temperature between about 128° C. and about 171° C., a mold pressure between about 450 N/cm$^2$ and about 1380 N/cm$^2$, and a mold time between about 1 minute and about 12 minutes. A particular composition will operate optimally at a particular temperature, pressure, and mold cycle time within those ranges. To correct for increased molding temperature, a slower initiator system can be used. To compensate for higher molding pressure, a faster initiator system can be used. To compensate for a shorter mold time, a faster initiator system can be used or more of the fast initiator can be used.

The formulator can adapt the in-mold coating powder formulations of the present invention to particular molding conditions by determining the desired stroke cure time for the desired molding conditions, then revising a particular formulation, usually by modifying the quantity or selection of initiators, to achieve the desired stroke cure time.

The stroke cure time of a coating powder composition is measured by distributing ¼ teaspoon (1.2 ml.) of the coating powder directly on the steel surface of a hot plate preheated to 300° F.±2° F. (149° C.±1° C.), forming a one inch (2.5 cm) diameter spot. The coating is then kneaded with a spatula on the hot plate until it melts, at which time a timer is started. The melt is patted with the spatula until strings are no longer pulled from the melt by the spatula, the timer is then read and the reading is recorded as the stroke cure time. A fast formulation (not to be confused with a fast initiator) will have a stroke cure time of from 10 to 19 seconds; a moderate formulation will have a stroke cure time from 20 to 29 seconds; a slow formulation will have a stroke cure time of from 30 to 39 seconds, and a very slow formulation will have a stroke cure time of 40 or more seconds.

One particular advantage of the present formulations containing a fast initiator and a slow initiator is that the stroke cure time can be changed substantially by a small change in the proportion of the fast initiator (which constitutes only from about 0.01 to about 2 parts per hundred parts of resin). The cure rate of the formulation can thus be adapted to particular molding times, pressures, and temperatures without substantially changing other properties of the formulation, such as the selection or relative proportions of initiator and resin, melt viscosity, pigment or filler loading, etc.

In-Mold Coating Method

The method for forming a cured, unsaturated polyester coating on a cured, unsaturated polyester fill resin substrate begins by providing one of the coating powder compositions described above, heating the mold surface to a temperature which preferably is between about 127° C. and about 171° C., and powder coating the composition on the mold surface Then the composition is maintained on the mold surface at the indicated temperature until the coating flows and coalesces, forming a partially crosslinked coating having an outer surface (defined herein as the surface against the mold surface) and an opposed inner surface. Next, the inner surface of the coating is contacted at an interface with a no more than partially crosslinked unsaturated polyester fill resin substrate. In the preferred mode of the invention, the substrate is a fiberglass reinforced plastic mass of molding material, for example, sheet molding compound (SMC), dough molding compound (DMC), bulk molding compound (BMC), or the like. The coating and fill resin are kept within the closed mold at an elevated temperature and pressure until the fill resin has flowed to its final dimensions and the fill resin and coating have each cured sufficiently to remove the article from the mold without damaging it. At this point, the coating and substrate will have crosslinked across the interface between them, thereby providing a strongly adherent coating which is not easily chipped or otherwise separated from the substrate. If molding conditions are optimized and the coating is pigmented or otherwise adapted to be an outside coating, the part can be used or sold as molded. If the coating is a primer or other subsidiary coating, the part can be further decorated as desired.

Moldability and Aesthetics

Moldability is evaluated qualitatively by using a formulation to in-mold coat a particular fill resin, then evaluating the coating surface after the part is demolded. Moldability is considered good if the coating parts cleanly from the mold surface and adheres tightly to the part over the entire coated surface.

Aesthetics is qualitatively determined by evaluating any visible defects in the coating. The following are aesthetic defects to which coatings are sometimes susceptible. Washouts are areas of the coating which have partially dissolved in the fill resin during molding. Washouts are characterized by filigree type tearing, multiple small holes in the coating, and a marbleized appearance. Tearing is a clean-edged split in the coating which renders a groove of the underlying fill resin visible (if the fill resin has a contrasting color). Lifting is a small network of cracks extending through the coating and into the fill resin. Little regions of the coating defined by the cracks are pulled away from the nominal interface with the fill resin, and some of the fill resin under the coating is also pulled away. Incompatibility is manifested as bubbles or inadequate adhesion between the coating and substrate. The previous defects are substantially absent in a coating having good moldability. Lesser defects are as follows. Orange peel, yellowing, and graininess have their usual meanings. Mottling is different coloration of different parts of the coating, usually due to changes in pigmentation of the coating as it is applied to the mold. Telegraphing or print-through are impressions of the glass fibers of the fill resin in the visible surface of the coating.

Aesthetics is graded approximately as follows herein. A coating having excellent aesthetics has very little orange peel, very high gloss, and no graininess, bubbles, or other defects as noted above. Good aesthetics allows room for detectable (but not prominent) print-through or other defects. "Fair" denotes a coating which still has good moldability but can have some surface roughness and lower gloss—for example, reflectivity of less than 70% at a 60 degree angle of incidence. A poor coating is one which lacks good moldability because of any of the moldability defects noted above.

Example 1

The ingredients listed in Table II were dry mixed until homogeneous. Next, the mixture was extruded in a single screw Buss extruder in which the front zone was maintained at 175° F. (79° C.), the rear zone was maintained at 150° F. (66° C.), and the residence time was about 20 seconds at the time the extrusion was started. After a melt was achieved, the front zone temperature was changed to 165° F. (74° C.) and the rear zone heating was discontinued. The temperature of the melt was thereby maintained between 190° F. and 240° F. (88°–116° C.). The extrudate was passed through chill rolls and a chipper, and the chips were ground to a powder and screened. Particles passing through a no. 100 screen (U.S. Standard Sieve Series; a no. 100 screen has 149 micron square openings defined by 110 micron diameter wires) were collected and constituted the coating powder. This composition was found to have a stroke cure time of 22 seconds.

A 22 square inch (142 cm$^2$) shallow, tray-shaped, polished, chrome-plated mold was heated to 300° F.±10° F. (149° C.±6° C.). The molding surfaces were electrostatically powder coated with a spray gun fed from a fluidized bed. A charge of about 160 grams of fill resin (Z-1003 sheet molding compound, containing more than 20% glass fiber, sold by Interplastic Corporation, Molding Products Division, South Bend, Ind.) was placed in the mold. The mold was closed and pressed at about 1000 psi (±200 psi) (690 N/cm$^2$±140 N/cm$^2$) for 120 seconds, which was sufficient to cure the fill resin. The press was opened, the part was removed, and flash was trimmed. The coating was 75 microns thick, and was found to be smooth, unbroken, and tightly adherent to the underlying fill resin. The part would be adequate for many purposes without further surface finishing of any kind.

Examples 2-24

The compositions of Examples 2-24 were compounded and in-mold coated as described in Example 1. Moldability and aesthetics were very good and good for the compositions of Table III, employing both a fast initiator and a slow initiator and using DAP-A or TAP-3 as the copolymerizable second resin. For the compositions of Table IV the effects of five different copolymerizable second resins were compared. DAPren gave good moldability and aesthetics, but showed some yellowing and orange peel. DAP-A provided very good moldability, good aesthetics, and slight orange peel. IsoDAP gave excellent moldability and aesthetics. TAC provided very good moldability and aesthetics at a low level (5 PHR). DAP-J provided good moldability and very good aesthetics. In Examples 12-18 of Tables V and VI, seven different fast initiators were used. In each instance, good performance and a textured coating surface were obtained In Examples 19-24 of Tables VI and VII, poor performance was obtained, but would be curable by optimization of the formula. Specifically, in Examples 19 and 22 the concentrations of both the fast initiator and the slow initiator exceeded optimal values. In Example 20, the filler concentration was too high. In Example 21, too much of the fast initiator was present. In Example 23, the copolymerizable second resin was a polybutadiene copolymer resin (HYCAR), which caused a compatibility problem with the chosen SMC and is not among the most preferred copolymerizable resins. In Example 24, the coating blocked, meaning it was not free-flowing and readily sprayable. This is the result of using too much of a liquid initiator (LUPERSOL P-31 is a dispersion in mineral oil).

Examples 25-32

The compositions of Examples 25-32 were compounded and in-mold coated as described in Example 1. In Example 25, good coating moldability and aesthetics were obtained. In Examples 26 and 27 employing the same unsaturated polyester but TAC as a copolymerizable resin, the coating yellowed. Examples 28-30 and 32 show that the invention is operable with various commercially available unsaturated polyester resins. Example 31, employing the same polyester, copolymerizable resin, and initiator system as Example 28 and 30 but a higher level of filler, did not perform well, suggesting the presence of an excessive amount of the filler.

Examples 33-60

These compositions were compounded and in-mold coated as described in Example 1, using AROPOL 7501 as the unsaturated polyester resin and various single initiators. Examples 33-43 show successful use of Species AE as the sole initiator, in conjunction with various copolymerizable resins, to provide good moldability and aesthetics and a smooth coating surface.

In contrast, Examples 44-60 employing many other single initiators or different amounts of Species AE provided poor performance. Lesser or greater than optimal amounts of Species AE were used in Examples 44 and 53. In Examples 45, 6, 48-52, and 54-56, too much of the chosen single initiator evidently was used, thus demonstrating that a fast initiator present in a higher concentration does not function as well as the combination of a fast initiator and a slow initiator used in previous examples. Species 47 employed a medium rate initiator and failed. In Examples 57, 58, and 60 too much liquid was present in the powder formulation, causing the coating to block. In Example 59, the coating yellowed.

Examples 61-72

Examples 61-72 are single-initiator coatings based on other unsaturated polyester resins, prepared as in Example 1. In Examples 61 and 62 the resins selected caused the powder coating to be grainy. In Examples 63 and 64 the presence of TAC appeared to cause yellowing problems. Examples 65 and 66 demonstrated good performance with different single-initiator resin systems than were used in prior examples. In Example 67 a slightly different resin system and more of the single initiator (Species AE) than was present in Example 66 reduced aesthetics and moldability from good to poor. Example 68 (good performance) vs. 69 (poor performance) shows that a change in the selection of copolymerizable resin can be critical in a particular formulation. Examples 70-72 show good (70) and bad (71-72) in-mold coating performance when the same initiator type (Species AE) and amount is used with different resins.

Examples 73-79

In these instances, single initiator coatings were formulated with blends of unsaturated polyester resins as described in Example 1. Good performance of the in-mold coatings was obtained in each instance. The utility of these resins in practicing the present invention is thus confirmed.

From all the examples, the following broad conclusions can be drawn. First, the best coatings were provided by the combination of a fast initiator and a slow initiator, the former being present at a low concentration and the latter being present at a high concentration, each as defined in the claims. This result is surprising because the art has not emphasized mixtures of initiators. Second, the only single initiator which provided good performance was Species AE. This initiator by itself functioned well with a variety of unsaturated polyesters and polymerizable resins. This result is surprising because the prior art has not selected this initiator in preference to the other such initiators known in the art. Also, under the conditions studied here, most known initiators, used alone, did not function well.

TABLE I

| Species | Chemical Name | 10 hr. T½° C. | 1 hr. T½° C. |
|---|---|---|---|
| A | 2,4-dichloro-benzoyl peroxide | 54 | 73 |
| B | diisononanoyl peroxide | 61 | 78 |
| C | decanoyl peroxide | 61 | 80 |
| D | lauroyl peroxide | 62 | 80 |
| E | succinic acid peroxide | 66 | 91 |
| F | acetyl peroxide | 69 | 87 |
| G | benzoyl peroxide | 73 | 91 |
| H | diisobutyryl peroxide | 21 | — |
| I | acetyl cyclohexylsulfonyl peroxide | 31 | 45 |
| J | di(n-propyl) peroxydicarbonate | 50 | 66 |
| K | di(sec-butyl) peroxydicarbonate | 50 | 67 |
| L | di(2-ethylhexyl) peroxydicarbonate | 49 | 67 |
| M | diisopropyl peroxydicarbonate | 50 | — |
| N | dicyclohexyl peroxydicarbonate | 50 | — |
| O | alpha-cumyl-peroxy-neodecanoate | 38 | 56 |
| P | alpha-cumyl-peroxy-pivalate | 47 | 65 |
| Q | t-amylperoxy-neodecanoate | 46 | 64 |
| R | t-butylperoxy-neodecanoate | 49 | 67 |
| S | t-amylperoxy-pivalate | 54 | 74 |
| T | t-butylperoxy-pivalate | 55 | 74 |
| U | 2,5-dimethyl-2,5-di(2-ethylhexanoyl peroxy)-hexane | 67 | 84 |
| V | t-amylperoxy-2-ethyl-hexanoate* | 75 | 92 |
| W | t-butylperoxy-2-ethyl-hexanoate** | 77 | 95 |
| X | t-butylperoxy-isobutyrate | 79 | 95 |
| Z | 2,2'-azobis-(2,4-dimethyl-valeronitrile | 52 | — |
| AA | azobisiso-butyronitrile | 64 | — |
| AB | 2,2'-azobis-(2-methyl-butyronitrile) | 68 | — |
| AC | t-butylperoxy-maleic acid | 87 | 110 |
| AD | 1,1'-azobis- | 88 | — |

*also known as t-amyl peroctoate
**also know as t-butyl peroctoate

TABLE I-continued

| Species | Chemical Name | 10 hr. T½° C. | 1 hr. T½° C. |
|---|---|---|---|
| | (1-cyclohexane-carbonitrile) | | |
| AE | 1,1-di(t-butyl-peroxy)-3,3,5-trimethylcyclohexane | 92 | 112 |
| AF | OO—t-butyl O—isopropyl monoperoxycarbonate | 99 | 119 |
| AG | 2,5-dimethyl-2,5-di(benzoylperoxy)hexane | 100 | 118 |
| AH | OO—t-butyl O—(2-ethylhexyl)-monoperoxycarbonate | 100 | 121 |
| AI | t-butylperoxyacetate | 102 | 120 |
| AJ | t-butylperoxybenzoate | 105 | 125 |
| AK | di-t-butyl diperoxyazelate | 99 | 118 |
| AL | di-t-butyl diperoxyphthalate | 105 | 123 |
| AM | dicumyl peroxide | 115 | 135 |
| AN | 2,5-dimethyl-2,5-di(t-butylperoxy)hexane | 119 | 138 |
| AO | t-butyl cumyl peroxide | 121 | 142 |
| AP | di-t-butyl peroxide | 126 | 149 |
| AQ | 2,5-dimethyl-2,5-di(t-butylperoxy)hexyne-3 | 128 | 149 |
| AR | 2,5-dihydroperoxy-2,5-dimethylhexane | 154 | 186 |
| AS | cumene hydroperoxide | 158 | 190 |
| AT | t-butyl hydroperoxide* | 117 | 140 |
| AU | t-amyl hydroperoxide | 165 | 183 |
| AV | n-butyl-4,4-bis-(t-butylperoxy)-valerate | 109 | 129 |
| AW | 1,1-di(t-butyl-peroxy)3,3,5-trimethylcyclohexane | 92 | 112 |
| AX | 1,1-di(t-butyl-peroxy)cyclohexane | 93 | 112 |
| AY | 1,1'-di-t-amyl-peroxycyclohexane | 93 | — |
| AZ | 2,2-di t-butyl-peroxybutane | 104 | 122 |
| BA | ethyl-3,3-di-(t-butylperoxy)butyrate | 115 | 135 |
| BB | t-butyl peroctoate and 1,1-di(t-butyl-peroxy)cyclohexane blend | — | — |
| BC | OO—t-butyl-O—isopropyl monoperoxycarbonate | — | — |
| BD | p,p'oxybis (benzene sulfonyl hydrazide) | — | — |
| BE | accelerated azocarbonamide | — | — |

*70% in solution; also contains 18% di-t-butyl hydroperoxide, water, and ethanol

TABLE II

| Ingredient | PHR[1] |
|---|---|
| AROPOL 7501[2] (powdered) | 80 |
| IsoDAP[3] | 20 |
| benzoyl peroxide (98%, granular) | 0.1 |
| 1,1-di(t-butylperoxy)-3,3,5-trimethylcyclohexane | 4.8[4] |
| zinc stearate | 3 |
| titanium dioxide (TiO$_2$) | 30 |

[1] Abbreviation for parts by weight per 100 parts resin by weight.
[2] polyester of isophthalic acid, maleic acid, and propylene glycol having an average molecular weight of 2500. AROPOL is a trademark of Ashland Chemical, Columbus Ohio.
[3] iso-diallylphthalate prepolymer, average molecular weight 40,000. IsoDAP is a trademark of Osaka Soda, Osaka, Japan.
[4] Expressed as 100% active. Provided as 40% active absorbed on calcium carbonate carrier.

TABLE III

| Example: | 2 | 3 | 4 | 5 | 6 |
|---|---|---|---|---|---|
| Ingredient (PHR) | | | | | |
| AROPOL 7501 | 60 | 60 | 75 | 75 | 60 |
| DAP - A[5] | 40 | 40 | 25 | 25 | — |
| TAP-3[6] | — | — | — | — | 40 |
| 231-XL[7] | 4.8 | 4.8 | 4.8 | 4.8 | 4.8 |
| LUCIDOL 98[8] | 0.23 | — | 0.20 | 0.23 | 0.23 |
| ALPEROX F[9] | — | 0.32 | — | — | — |
| Zn Stearate | 3 | 3 | 3 | 3 | 3 |
| TiO$_2$ | 30 | 30 | 30 | 30 | 30 |

[5] diallyl phthalate prepolymer, average molecular weight 55,000. DAP-A is a trademark of Osaka Soda Co., Osaka, Japan.
[6] Triallyl monomer. TAP-3 is a trademark of Estron Chemical, Inc., Calvert City, Kentucky.
[7] LUPERSOL 231-XL (trademark of Lucidol Division of Pennwalt Corporation for initiator species AE, 40% active on a calcium carbonate carrier. Weight given excludes carrier weight.)
[8] Trademark of Lucidol Division for benzoyl peroxide.
[9] Trademark of Lucidol Division for lauroyl peroxide

TABLE IV

| Example: | 7 | 8 | 9 | 10 | 11 |
|---|---|---|---|---|---|
| Ingredient (PHR) | | | | | |
| AROPOL 7501 | 60 | 60 | 80 | 95 | 75 |
| DAPren[10] | 40 | — | — | — | — |
| DAP A | — | 40 | — | — | — |
| IsoDAP | — | — | 20 | — | — |
| TAC[11] | — | — | — | 5 | — |
| DAP-J[12] | — | — | — | — | 25 |
| 231-XL | 4.8 | 4.8 | 6 | 6 | 6 |
| LUCIDOL 98 | 0.23 | 0.3 | 0.1 | 0.1 | 0.1 |
| Zn Stearate | 3 | 3 | 2 | 2 | 2 |
| TiO$_2$ | — | — | 30 | 30 | 30 |

[10] trademark for a diallyl phthalate prepolymer, average molecular weight 55,000, sold by Osaka Soda Co.
[11] triallyl cyanurate, TAC is a trademark of Degussa Corporation.
[12] trademark for a diallyl phthalate prepolymer, average molecular weight 55,000, sold by Osaka Soda Co.

TABLE V

| Example: | 12 | 13 | 14 | 15 | 16 |
|---|---|---|---|---|---|
| Ingredient (PHR) | | | | | |
| AROPOL 7501 | 60 | 60 | 60 | 60 | 60 |
| DAP-A | 40 | 40 | 40 | 40 | 40 |
| 231-XL | 4.8 | 4.8 | 4.8 | 4.8 | 4.8 |
| LUPERSOL 575[13] | 0.26 | — | — | — | — |
| LUPERSOL 80[14] | — | 0.23 | — | — | — |
| VAZO 52[15] | — | — | 0.3 | — | — |
| VAZO 64[16] | — | — | — | 0.2 | — |
| VAZO 67[17] | — | — | — | — | 0.22 |
| Zn Stearate | 3 | 3 | 3 | 3 | 3 |

TABLE V-continued

| Example: | 12 | 13 | 14 | 15 | 16 |
|---|---|---|---|---|---|
| TiO$_2$ | 30 | 30 | 30 | 30 | 30 |

[13]Species V, Table I; trademark of Lucidol Division.
[14]Species X, Table I; trademark of Lucidol Division.
[15]Species Z, Table I; trademark of E. E. du Pont de Nemours & Co., Wilmington, Delaware (Du Pont).
[16]Species AA, Table I; trademark of Du Pont.
[17]Species AB, Table I; trademark of Du Pont.

TABLE VI

| Example: | 17 | 18 | 19 | 20 | 21 |
|---|---|---|---|---|---|
| Ingredient (PHR) | | | | | |
| AROPOL 7501 | 60 | 60 | 25 | 50 | 60 |
| DAP-A | 40 | 40 | — | 50 | 40 |
| DAP-ren | — | — | 75 | — | — |
| 231-XL | 4.8 | 4.8 | 9.6 | 4.8 | 4.8 |
| TBP[18] | 0.3 | — | — | — | — |
| V-40[19] | — | 0.3 | — | — | — |
| LUCIDOL 98 | — | — | 0.46 | 0.23 | 0.5 |
| Zn Stearate | 3 | 3 | 3 | 3 | 3 |
| TiO$_2$ | 30 | 30 | 30 | 60 | — |

[18]t-butyl peroctoate
[19]trademark of Wako Chemicals USA, Inc., Dallas, Texas

TABLE VII

| Example: | 22 | 23 | 24 | 25 | 26 |
|---|---|---|---|---|---|
| Ingredient (PHR) | | | | | |
| AROPOL 7501 | 25 | 75 | 60 | — | — |
| URALAM 9494[20] | — | — | — | 75 | 95 |
| DAPren | 75 | — | — | — | — |
| DAP-A | — | — | 40 | 25 | — |
| HYCAR 1312LV[21] | — | 25 | — | — | — |
| TAC | — | — | — | — | 5 |
| 231-XL | 8 | 6 | — | 4.8 | 6 |
| LUCIDOL 98 | 0.5 | 0.3 | — | 0.2 | 0.1 |
| LUPERSOL P-31[22] | — | — | 14 | — | — |
| Zn Stearate | 3 | 4 | 3 | 3 | 2 |
| TiO$_2$ | 30 | — | 30 | 30 | 30 |

[20]Trademark for unsaturated polyester resin sold by DSM B.V., Resins Division, in the Netherlands.
[21]Trademark of C. P. Hall Co., Chicago, Illinois, for a polybutadiene copolymer.
[22]Trademark for Species BB, sold by the Lucidol Division.

TABLE VIII

| Example: | 27 | 28 | 29 | 30 | 31 |
|---|---|---|---|---|---|
| Ingredient (PHR) | | | | | |
| URALAM 9494 | 90 | — | — | — | — |
| HETRON 700G[23] | — | 60 | 25 | 75 | 50 |
| TAC | 10 | — | — | — | — |
| DAP-A | — | 40 | — | 25 | 50 |
| DAPren | — | — | 75 | — | — |
| 231-XL | 2.8 | 4.8 | 4.8 | 4.8 | 4.8 |
| LUCIDOL 98 | 0.2 | 0.23 | 0.23 | 0.92 | 0.23 |
| Zn Stearate | 3 | 3 | 3 | 3 | 3 |
| TiO$_2$ | 30 | 30 | 30 | — | 60 |

[23]An unsaturated polyester resin consisting essentially of the reaction product of fumaric acid, bisphenol A, and n-propylene glycol, sold by Ashland Chemical Co., Columbus, Ohio.

TABLE IX

| Example: | 32 | 33 | 34 | 35 | 36 |
|---|---|---|---|---|---|
| Ingredient (PHR) | | | | | |
| ATLAC 382E[24] | 60 | — | — | — | — |
| AROPOL 7501 | — | 60 | 60 | 60 | 60 |
| DAP-A | 40 | 40 | — | — | — |
| DAPren | — | — | 40 | — | — |
| IsoDAP | — | — | — | 40 | — |
| DAP J | — | — | — | — | 40 |
| 231-XL | 4.8 | 4.8 | 4.8 | 4.8 | 4.8 |

TABLE IX-continued

| Example: | 32 | 33 | 34 | 35 | 36 |
|---|---|---|---|---|---|
| LUCIDOL 98 | 0.23 | — | — | — | — |
| Zn Stearate | 3 | 3 | 3 | 3 | 3 |
| TiO$_2$ | 30 | 30 | 30 | 30 | 30 |

[24]an unsaturated polyester resin sold by Koppers Co., Inc., Pittsburgh, Pennsylvania

TABLE X

| Example: | 37 | 38 | 39 | 40 | 41 |
|---|---|---|---|---|---|
| Ingredient (PHR) | | | | | |
| AROPOL 7501 | 60 | 75 | 80 | 80 | 75 |
| DAP-A | 40 | 25 | — | — | — |
| IsoDAP | — | — | 20 | 20 | — |
| TAP-3 | — | — | — | — | 25 |
| 231-XL | 4.8 | 4.8 | 4.8 | 4.8 | 6 |
| Zn Stearate | 2 | 3 | 2 | 2 | 2 |
| TiO$_2$ | 30 | 30 | 30 | 30 | 30 |

TABLE XI

| Example: | 42 | 43 | 44 | 45 | 46 |
|---|---|---|---|---|---|
| Ingredient (PHR) | | | | | |
| AROPOL 7501 | 75 | 75 | 60 | 60 | 60 |
| DAP-A | — | — | 40 | 40 | 40 |
| IsoDAP | 25 | 25 | — | — | — |
| 231-XL | 4.8 | 6 | 1.6 | — | — |
| LUCIDOL 98 | — | — | — | 2.6 | — |
| ALPEROX F | — | — | — | — | 4.3 |
| Zn Stearate | 2 | 3 | 3 | 3 | 3 |
| TiO$_2$ | — | 30 | 30 | 30 | 30 |

TABLE XII

| Example | 47 | 48 | 49 | 50 | 51 |
|---|---|---|---|---|---|
| Ingredient (PHR) | | | | | |
| AROPOL 7501 | 60 | 60 | 60 | 60 | 60 |
| DAP A | 40 | 40 | 40 | 40 | 40 |
| LUPEROX PMA[25] | 2.03 | — | — | — | — |
| V-40 | — | 2.59 | — | — | — |
| LUPERSOL 575 | — | — | 2.57 | — | — |
| TBP | — | — | — | 2.36 | — |
| LUPERSOL 80 | — | — | — | — | 2.26 |
| Zn Stearate | 3 | 3 | 3 | 3 | 3 |
| TiO$_2$ | 30 | 30 | 30 | 30 | 30 |

[25]t-butylperoxymaleic acid (Species AC).

TABLE XIII

| Example: | 52 | 53 | 54 | 55 | 56 |
|---|---|---|---|---|---|
| Ingredient (PHR) | | | | | |
| AROPOL 7501 | 60 | 60 | 60 | 60 | 60 |
| DAPren | 40 | — | — | — | — |
| DAP A | — | 40 | 40 | 40 | 40 |
| LUCIDOL 98 | 2.6 | — | — | — | — |
| 231-XL | — | 9.6 | — | — | — |
| VAZO 52 | — | — | 2.63 | — | — |
| VAZO 64 | — | — | — | 1.74 | — |
| VAZO 67 | — | — | — | — | 2.04 |
| Zn Stearate | 3 | 3 | 3 | 3 | 3 |
| TiO$_2$ | 30 | 30 | 30 | 30 | 30 |

TABLE XIV

| Example: | 57 | 58 | 59 | 60 | 61 |
|---|---|---|---|---|---|
| Ingredient (PHR) | | | | | |
| AROPOL 7501 | 60 | 60 | 60 | 60 | — |
| URALAM 9494 | — | — | — | — | 50 |
| DAP A | 40 | 40 | 40 | 40 | 50 |

TABLE XIV-continued

| Example: | 57 | 58 | 59 | 60 | 61 |
| --- | --- | --- | --- | --- | --- |
| P-31 | 14 | — | — | — | — |
| LUPERSOL 231[26] | — | 4.8 | — | — | — |
| 231-SRL[27] | — | — | 4.8 | — | — |
| 531-80B[28] | — | — | — | 5.72 | — |
| 231-XL | — | — | — | — | 4.8 |
| Zn Stearate | 3 | 3 | 3 | 3 | 3 |
| TiO$_2$ | 30 | 30 | 30 | 30 | 30 |

[26]Species Z, sold as a liquid. LUPERSOL 231 is a trademark of the Lucidol Division.
[27]LUPERSOL 231-SRL - a trademark of the Lucidol Division for Species AE on a substrate.
[28]Trademark of the Lucidol Division for species AY (80% liquid in butyl benzyl phthalate).

TABLE XV

| Examples: | 62 | 63 | 64 | 65 | 66 |
| --- | --- | --- | --- | --- | --- |
| Ingredient (PHR) | | | | | |
| URALAM 9494 | 75 | 90 | 75 | — | — |
| HETRON 700G | — | — | — | 60 | — |
| E2299[29] | — | — | — | — | 60 |
| DAP A | 25 | — | — | 40 | — |
| TAC | — | 10 | 25 | — | — |
| IsoDAP | — | — | — | — | 40 |
| 231-XL | 6 | 4.8 | 4.8 | 4.8 | 4.8 |
| Zn Stearate | 3 | 3 | 3 | 3 | 3 |
| TiO$_2$ | 30 | 30 | 30 | 30 | 30 |

[29]product designation of Ciba-Geigy Corporation, Ardsley, New York, for an unsaturated polyester.

TABLE XVI

| Example: | 67 | 68 | 69 | 70 | 71 |
| --- | --- | --- | --- | --- | --- |
| Ingredient (PHR) | | | | | |
| E2299 | 75 | — | — | — | — |
| E2477[30] | — | 75 | 75 | — | — |
| ATLAC 382E | — | — | — | 90 | — |
| E2476[31] | — | — | — | — | 60 |
| DAP A | 25 | — | 25 | — | 40 |
| IsoDAP | — | 25 | — | — | — |
| TAC | — | — | — | 10 | — |
| 231-XL | 6 | 6 | 6 | 4.8 | 6 |
| Zn Stearate | 3 | 3 | 3 | 2 | 3 |
| TiO$_2$ | 30 | 30 | 30 | 30 | 30 |

[30]product designation of Ciba-Geigy for an unsaturated polyester.
[31]product designation of Ciba-Geigy for an unsaturated polyester.

TABLE XVII

| Example: | 72 | 73 | 74 | 75 | 76 |
| --- | --- | --- | --- | --- | --- |
| Ingredient (PHR) | | | | | |
| E2476 | 80 | — | — | — | — |
| AROPOL 7501 | — | 50 | 37.5 | 37.5 | — |
| HETRON 700G | — | 10 | — | — | — |
| URALAM 9494 | — | — | 37.5 | — | 37.5 |
| ATLAC 382E | — | — | — | 37.5 | 37.5 |
| DAP A | 20 | 40 | — | — | — |
| Iso DAP | — | — | 25 | 25 | 25 |
| 231-XL | 6 | 4.8 | 6 | 6 | 6 |
| Zn Stearate | 3 | 3 | 2 | 2 | 2 |
| TiO$_2$ | 30 | 30 | 30 | 30 | 30 |

TABLE XVIII

| Example: | 77 | 78 | 79 |
| --- | --- | --- | --- |
| Ingredient (PHR) | | | |
| AROPOL 7501 | 70 | 60 | 50 |
| URALAM 9494 | 10 | 20 | 30 |
| DAP A | 20 | 20 | 20 |
| 231-XL | 6 | 6 | 6 |
| Zn Stearate | 3 | 3 | 3 |
| TiO$_2$ | 30 | 30 | 30 |

We claim:

1. An unsaturated polyester resin coating powder composition consisting essentially of:
   A. from about 20 to 100 parts by weight of at least one unsaturated polyester resin;
   B. from 0 to about 80 parts by weight of at least one copolymerizable second resin, wherein the total proportion of resin is 100 parts by weight;
   C. from about 0.01 to about 2 parts by weight per 100 parts resin by weight of a fast initiator having a ten hour half-life at not more than 82° C.; and
   D. from about 3 to about 7 parts by weight per 100 parts resin by weight of a slow initiator having a ten hour half-life at about 91° C. or more.

2. The composition of claim 1, comprising from about 50 to about 95 parts by weight of said unsaturated polyester resin, about 5 to about 50 parts by weight of said polymerizable second resin, about 0.1 to about 0.3 parts by weight of said fast initiator per 100 parts resin by weight and about 4 to about 6 parts by weight of said slow initiator per 100 parts resin by weight.

3. The composition of claim 1, further consisting essentially of from about 2 to about 7 parts by weight per 100 parts resin by weight of a mold release agent.

4. The composition of claim 1, having a shelf life of at least about 6 months at 90° C.

5. The composition of claim 1, consisting essentially of the following proportions of ingredients:
   A. about 58 percent by weight of said polyester;
   B. about 15 percent by weight of said second resin;
   C. about 0.07 percent by weight of said fast initiator;
   D. about 3 percent by weight of said slow initiator; and
   E. as essentially the balance of said composition, ingredients selected from mold release agents, pigments, fillers, and opacifiers.

6. The composition of claim 5, wherein said balance consists essentially of about 2 percent by weight of a mold release agent and about 22 percent by weight of ingredients selected from pigments, fillers, and opacifiers.

7. The composition of claim 1, wherein said unsaturated polyester resin comprises at least one reaction product of an unsaturated polycarboxylic acid selected from isophthalic acid, maleic acid, fumaric acid, succinic acid, phthalic acid, isophthalic acid, terephthalic acid, adipic acid, tetrachlorophthalic acid, or anhydrides thereof with a polyol selected from propylene glycol, neopentyl glycol, ethylene glycol, bisphenol A, 1,6-hexanediol, diethylene glycol, 1,2-propylene glycol, or 1,3-propylene glycol.

8. The composition of claim 7, wherein said unsaturated polycarboxylic acid is a mixture of isophthalic acid and maleic acid and said polyol is propylene glycol.

9. The composition of claim 7, wherein said unsaturated polycarboxylic acid is fumaric acid and said polyol is bisphenol A and n-propylene glycol.

10. The composition of claim 1, wherein said copolymerizable second resin is selected from diallyl phthalate; polymers of diallyl phthalate; diallyl isophthalate;

polymers of diallyl isophthalate; triallyl cyanurate; triallyl isocyanurate; and mixtures and copolymers thereof.

11. The composition of claim 1, wherein said fast initiator is selected from:
   2,4-dichlorobenzoyl peroxide;
   diisononanoyl peroxide;
   decanoyl peroxide;
   lauroyl peroxide;
   succinic acid peroxide;
   acetyl peroxide;
   benzoyl peroxide;
   diisobutyryl peroxide;
   acetyl cyclohexylsulfonyl peroxide;
   di(n-propyl)peroxydicarbonate;
   di(sec-butyl)peroxydicarbonate;
   di(2-ethylhexyl)peroxydicarbonate;
   diisopropyl peroxydicarbonate;
   dicyclohexyl peroxydicarbonate;
   alpha-cumylperoxyneodecanoate;
   alpha-cumylperoxypivalate;
   t-amylperoxyneodecanoate;
   t-butylperoxyneodecanoate;
   t-amylperoxypivalate;
   t-butylperoxypivalate;
   2,5-dimethyl-2,5-di(2-ethylhexanoyl peroxy)hexane;
   t-amylperoxy-2-ethylhexanoate;
   t-butylperoxy-2-ethylhexanoate;
   t-butylperoxyisobutyrate;
   2,2'-azobis 2,4-dimethylvaleronitrile;
   azobisisobutyronitrile; and
   2,2'-azobis(2-methylbutyronitrile).

12. The composition of claim 11, wherein said fast initiator is selected from:
   2,2'azobis(2,4-dimethylvaleronitrile);
   azobisisobutyronitrile;
   lauroyl peroxide;
   2,2'-azobis(2-methylbutyronitrile);
   benzoyl peroxide;
   t-amyl-peroxy-2-ethylhexanoate;
   t-butylperoctoate; and
   t-butylperoxyisobutyrate.

13. The composition of claim 12, wherein said fast initiator is benzoyl peroxide.

14. The composition of claim 1, wherein said slow initiator is selected from:
   OO-t-butyl-O-isopropyl monoperoxycarbonate;
   2,5-dimethyl-2,5-di(benzoylperoxy)hexane;
   OO-t-butyl-O-(2-ethylhexyl)monoperoxycarbonate;
   t-butylperoxyacetate;
   t-butylperoxybenzoate;
   di-t-butyl diperoxyazelate;
   di-t-butyl diperoxyphthalate;
   dicumyl peroxide
   2,5-dimethyl-2,5-di(t-butylperoxy)hexane;
   t-butyl cumyl peroxide;
   di-t-butyl peroxide;
   2,5-dimethyl-2,5-di(t-butylperoxy)hexyne-3;
   2,5-dihydroperoxy-2,5-dimethylhexane;
   cumene hydroperoxide;
   t-butyl hydroperoxide;
   t-amyl hydroperoxide;
   n-butyl-4,4-bis(t-butylperoxy)valerate;
   1,1-di(t-butylperoxy)3,3,5-trimethylcyclohexane;
   1,1-di(t-butylperoxy)cyclohexane;
   1,1'-di-t-amylperoxycyclohexane;
   2,2-di(t-butylperoxy)butane;
   ethyl-3,3-di(t-butylperoxy)butyrate;
   t-butyl peroctoate and 1,1-di(t-butylperoxy)cyclohexane blend;
   OO-t-butyl-O-isopropyl monoperoxycarbonate;
   p,p'oxybis(benzene sulfonyl hydrazide); and
   accelerated azocarbonamide.

15. The composition of claim 1, wherein said slow initiator is selected from:
   1,1-di(t-butylperoxy)-3,3,5-trimethycyclohexane;
   1,1-di-tbytylperoxycyclohexane;
   1,1-di-t-amylperoxycyclohexane;
   p,p,-oxybis(benzenesulfonyl hydrazide); and
   accelerated azocarbonamide.

16. The composition of claim 1, wherein said slow initiator is from about 4.8 to 6 parts by weight per 100 parts resin by weight of 1,1-di(t-butylperoxy)-3,3,5-trimethylcyclohexane.

17. The composition of claim 16, wherein said fast initiator is about 0.1 parts by weight per 100 parts resin by weight benzoyl peroxide.

18. The composition of claim 16, wherein said fast initiator is about 0.3 parts by weight of lauroyl peroxide per 100 parts resin by weight.

19. The composition of claim 16, wherein said fast initiator is about 0.3 parts by weight of 1,1'-azobis(1-cyclohexanecarbonitrile) per 100 parts resin by weight.

20. The composition of claim 16, wherein said fast initiator is about 0.3 parts by weight of t-butyl peroctoate per 100 parts resin by weight.

21. The composition of claim 16, wherein said fast initiator is about 0.26 parts by weight of t-amyl-peroxy-2-ethylhexanoate per 100 parts resin by weight.

22. The composition of claim 16, wherein said fast initiator is about 0.23 parts by weight of t-butyl-peroxyisobutyrate per 100 parts resin by weight.

23. The composition of claim 16, wherein said fast initiator is about 0.3 parts by weight of 2,2'-azobis(2,4-dimethylvaleronitrile) per 100 parts resin by weight.

24. The composition of claim 16, wherein said fast initiator is about 0.2 parts by weight of azobisisobutyronitrile per 100 parts resin by weight.

25. The composition of claim 16, wherein said fast initiator is about 0.2 parts by weight of 2,2'-azobis(2-methylbutyronitile) per 100 parts resin by weight.

26. An unsaturated polyester resin coating powder composition consisting essentially of:
   A. about 20 to 100 parts by weight of at least one unsaturated polyester resin;
   B. about 0 to 80 parts by weight of at least on copolymerizable second resin, wherein the total proportion of resin is 100 parts by weight; and
   C. about 3 to about 15 parts by weight per 100 parts resin by weight of 1,1-di(t-butylperoxy)-3,3,5-trimethylcyclohexane as an initiator.

27. The composition of claim 26, comprising from about 12 to about 15 parts by weight of said initiator per 100 parts resin by weight.

28. The composition of claim 26, comprising from about 4.8 to 9 parts by weight of said initiator per 100 parts resin by weight.

29. The composition of claim 26, comprising from 3 to about 9 parts by weight of said initiator per 100 parts by weight.

30. The composition of claim 26, wherein 1,1'di-(t-butylperoxy)-3,3,5-trimethylcyclohexane is substantially the sole initiator present.

* * * * *